(12) United States Patent
Lee

(10) Patent No.: US 6,971,752 B2
(45) Date of Patent: Dec. 6, 2005

(54) COLOR WHEEL FIXING STRUCTURE FOR PROJECTOR

(75) Inventor: Heong-seog Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 76 days.

(21) Appl. No.: 10/714,402

(22) Filed: Nov. 17, 2003

(65) Prior Publication Data

US 2004/0145707 A1 Jul. 29, 2004

(30) Foreign Application Priority Data

Nov. 21, 2002 (KR) ............................... 2002-34832

(51) Int. Cl.[7] ......................... G03B 21/14; H04N 9/12; G02B 5/22; G02B 27/00; F21V 9/00
(52) U.S. Cl. .......................... 353/84; 353/20; 353/97; 348/742; 348/743; 359/891; 359/892; 359/578; 362/293
(58) Field of Search ...... 353/84, 20, 97; 348/742–743; 359/891–892, 578; 362/293

(56) References Cited

U.S. PATENT DOCUMENTS

| | | | |
|---|---|---|---|
| 5,868,482 A | * | 2/1999 | Edlinger et al. ............... 353/84 |
| 6,024,453 A | * | 2/2000 | Edlinger et al. ............... 353/84 |
| 6,618,213 B2 | * | 9/2003 | Inamoto ........................ 359/889 |
| 6,705,733 B1 | * | 3/2004 | Yu et al. ......................... 353/84 |
| 6,715,887 B2 | * | 4/2004 | Chang ........................... 353/84 |
| 6,755,554 B2 | * | 6/2004 | Ohmae et al. ............... 362/293 |
| 6,896,376 B2 | * | 5/2005 | Chin et al. ..................... 353/84 |
| 2002/0003704 A1 | | 1/2002 | Ohmae et al. |

* cited by examiner

Primary Examiner—David Gray
Assistant Examiner—Magda Cruz
(74) Attorney, Agent, or Firm—Sughrue Mion, PLLC

(57) ABSTRACT

A fixing structure for fixing a color wheel to a base of a projector is provided. The color wheel is rotatably installed and includes a color rotating disc having a plurality of color filters selectively transmitting light of a predetermined wavelength, and a driving source which drives the color rotating disc. The fixing structure includes a first cover member coupled to a base, and a second cover member coupled to the first cover member and together therewith encompassing the color wheel. A bracket is provided to which the color wheel is coupled, and a coupling unit couples the bracket to the second cover member. A buffer member is provided between the first and second cover members and between the bracket and the second cover member for reducing vibration.

4 Claims, 4 Drawing Sheets

COLOR WHEEL FIXING STRUCTURE FOR PROJECTOR

This application claims the priority of Korean Utility Model Application No. 2002-34832 filed on 21 Nov. 2002 in the Korean Intellectual Property Office, the disclosure of which is incorporated herein in its entirety by reference.

BACKGROUND OF THE INVENTION

1. Field of the Invention

An apparatus consistent with the present invention relates to a structure for fixing a color wheel for a projector and, more particularly, to a structure for fixing a color wheel for a projector which can reduce noise generated during rotation of a color wheel.

2. Description of the Related Art

FIG. 1 is a perspective view illustrating an optical structure of a color liquid crystal display (LCD) projector which can realize a color image using a single LCD panel. In FIG. 1, a white light emitted from a lamp 10 and reflected by a reflection mirror 11 passes through a color wheel 30 rotatably installed in front of the lamp 10 and sequentially turns to lights of red (R), blue (B), and green (G).

A plurality of color filters 32 selectively transmitting each of the red, blue, and green lights of an incident white light are sequentially arranged along the color wheel 30. The color wheel 30 includes a color rotating disc 31 rotatably installed such that the respective color filters 32 are sequentially arranged on an optical path, and a driving source 35 driving the color rotating disc 31 to rotate.

Thus, a predetermined color light transmitting the color filters 32 disposed on the optical path of the color wheel 30 becomes a uniform light as it passes through a glass rod 13 which is rectangular. The uniform light passes through an image lens 14, a cold mirror 15 transmitting an infrared light ray and reflecting the remaining light, and a first focusing lens 16 focusing an incident light, so as to be incident on an image generating unit in a nearly parallel state. The image generating unit includes an LCD device 18, and a pair of polarization panels 17 provided at the opposite sides of the LCD device 18. The image generating unit generates an image using the light emitted from the lamp 10 according to the operation of the LCD device 18.

The light generated by the image generating unit passes through a second focusing lens 19 and a projection lens 20. The projection lens 20 includes a reflection mirror 21 and a plurality of lens units 22 which determine a level of focusing and magnification of an image. Then, the light is reflected by a total reflection mirror 23 arranged at a predetermined angle at the rear of a screen 24 and projected to the screen 24 by being magnified.

In the meantime, since the color wheel 30 is a rotating body which rotates at a high speed of over 9000 r.p.m., noise due to the rotation of the color rotating disc 31 and noise due to vibrations of a shaft (not shown) supporting the color rotating disc 31 are generated.

To reduce the above noises, a color wheel fixing structure as shown in FIG. 2 has been suggested.

Referring to FIG. 2, a conventional color wheel fixing structure includes a holder 45 to fix the color wheel 30 at a predetermined position of a base 41. A plurality of first coupling holes 38 are provided in a bracket 37 supporting the driving source 35. A plurality of first through-holes 46 are provided in the holder 45 at positions corresponding to the respective first coupling holes 38. Thus, the color wheel 30 can be fixed to the holder 45 by screwing a plurality of first screws 51 into the first coupling holes 38 through the first through-holes 46. An opening portion 47, through which light passing through the color wheel 30 can pass, is provided in the holder 45.

The holder 45 having the color wheel 30 coupled thereto is fixedly installed on a predetermined position of the base 41. To install the holder 45 at the base 41, a plurality of second through-holes 48 are provided at the holder 45 and a plurality of second coupling holes 42 are formed at predetermined positions on the base 41 corresponding to the second through holes 48. Thus, the holder 45 can be fixed to the base 41 by screwing a plurality of second screws 53 into the second coupling holes 42 through the second through-holes 48. Here, a buffer pad 55 is provided between the base 41 and the holder 45. Thus, as the buffer pad 55 absorbs vibrations of the color wheel 30 to a degree, noise generated from the color wheel 30 is reduced.

When the buffer pad 55 is provided to reduce noise as in the conventional color wheel fixing structure having the above structure, the diameter of the color rotating disc 31 should not be more than 45 mm and rotate at a low speed.

In the meantime, as the relevant technologies develop, in order to realize a high quality image in a projector, a faster speed is required in alternating colors which are filtered by a color wheel. To meet the above need, the number of the color filters 32 arranged by increasing the diameter of the color rotating disc 31 is increased so that the number of alternation of the color filters 32 during one turn of the color rotating disc 31 is increased, and simultaneously, the speed of rotation of the color rotation disc 31 needs to be increased. Accordingly, in the color wheel 30, the color rotating disc 31 needs to have a diameter of about 50 mm or more and a high rotation speed of over 9000 r.p.m. When the diameter is increased and a high speed rotation is performed, the noise cannot be reduced by the conventional buffer pad 55 only.

Further, when a color wheel assembly in which the color wheel 30 and the holder 45 are coupled is assembled on the base 41 with other optical elements, since the buffer pad 55 is provided, the time to assemble the optical elements with respect to the base 41 increases.

SUMMARY OF THE INVENTION

To solve the above and other problems, an apparatus consistent with the present invention provides a color wheel fixing structure for a projector which can reduce noise due to the rotation of the color wheel and the vibration of the shaft, and also reduce the time to assemble a color wheel assembly with respect to the base.

According to an aspect of the present invention, a fixing structure is provided for fixing a color wheel to a base of a projector. The color wheel comprises a color rotating disc having a plurality of color filters selectively transmitting light of a predetermined wavelength among white light emitted from a lamp and rotatably installed such that the respective color filters are sequentially arranged on an optical path, and a driving source which drives the color rotating disc to rotate. The fixing structure comprises a first cover member coupled to the base, a second cover member coupled to the first cover member and together therewith encompassing the color wheel, a bracket to which the color wheel is coupled, a coupling unit to couple the bracket to the second cover member, and a buffer member provided between the first and second cover members and between the bracket and the second cover member and which reduces vibration generated from the color wheel and transferred to the second cover member via the bracket, and vibration transferred from the second cover member to the first cover member.

BRIEF DESCRIPTION OF THE DRAWINGS

The above and other features and advantages consistent with the present invention will become more apparent by describing in detail illustrative, non-limiting embodiments thereof with reference to the accompanying drawings, in which.

DETAILED DESCRIPTION OF ILLUSTRATIVE, NON-LIMITING EMBODIMENTS OF THE INVENTION

Figure 3:
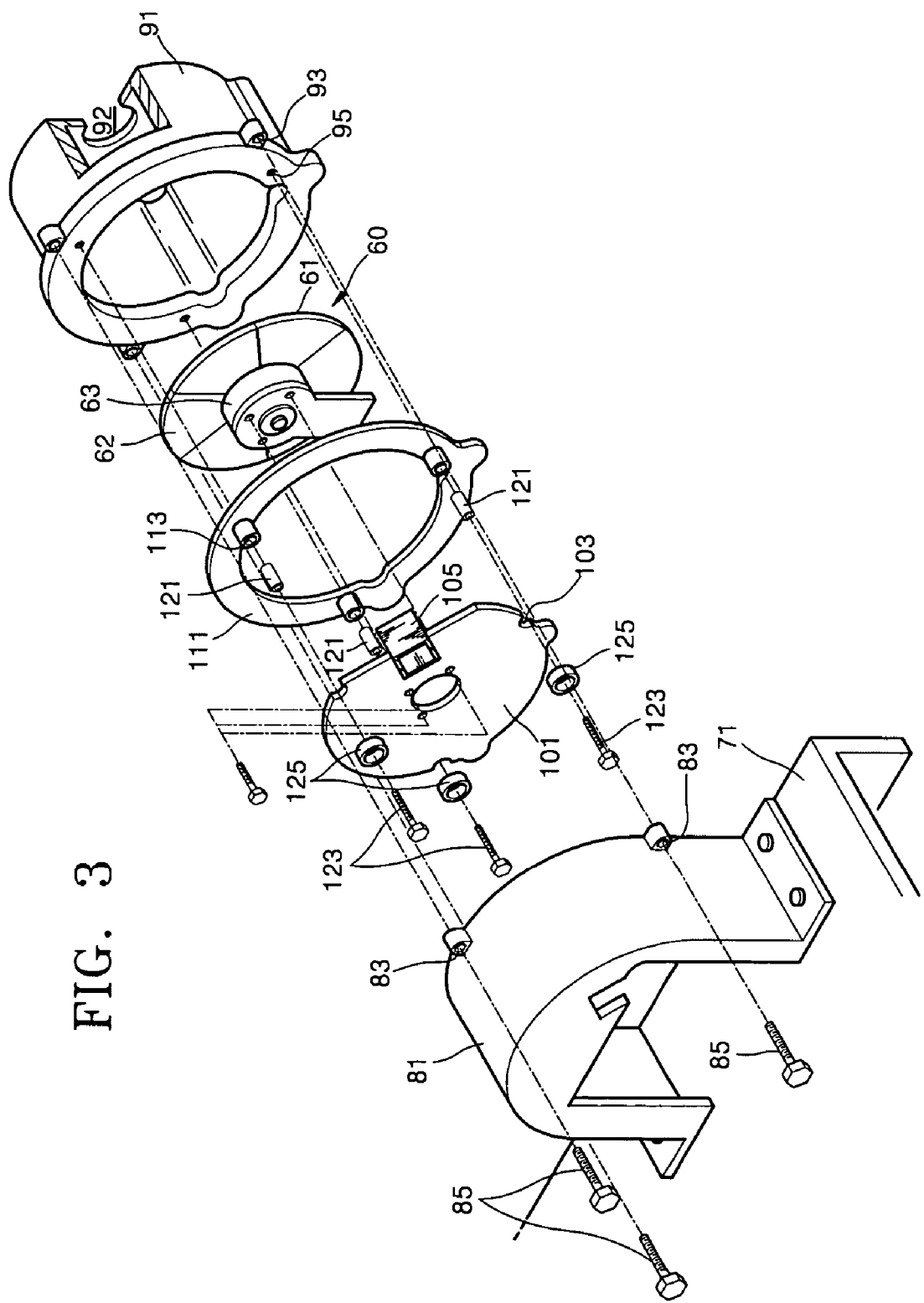
FIG. 3 is an exploded perspective view illustrating a color wheel fixing structure for a projector according to an exemplary embodiment of the present invention.
Figure 4:
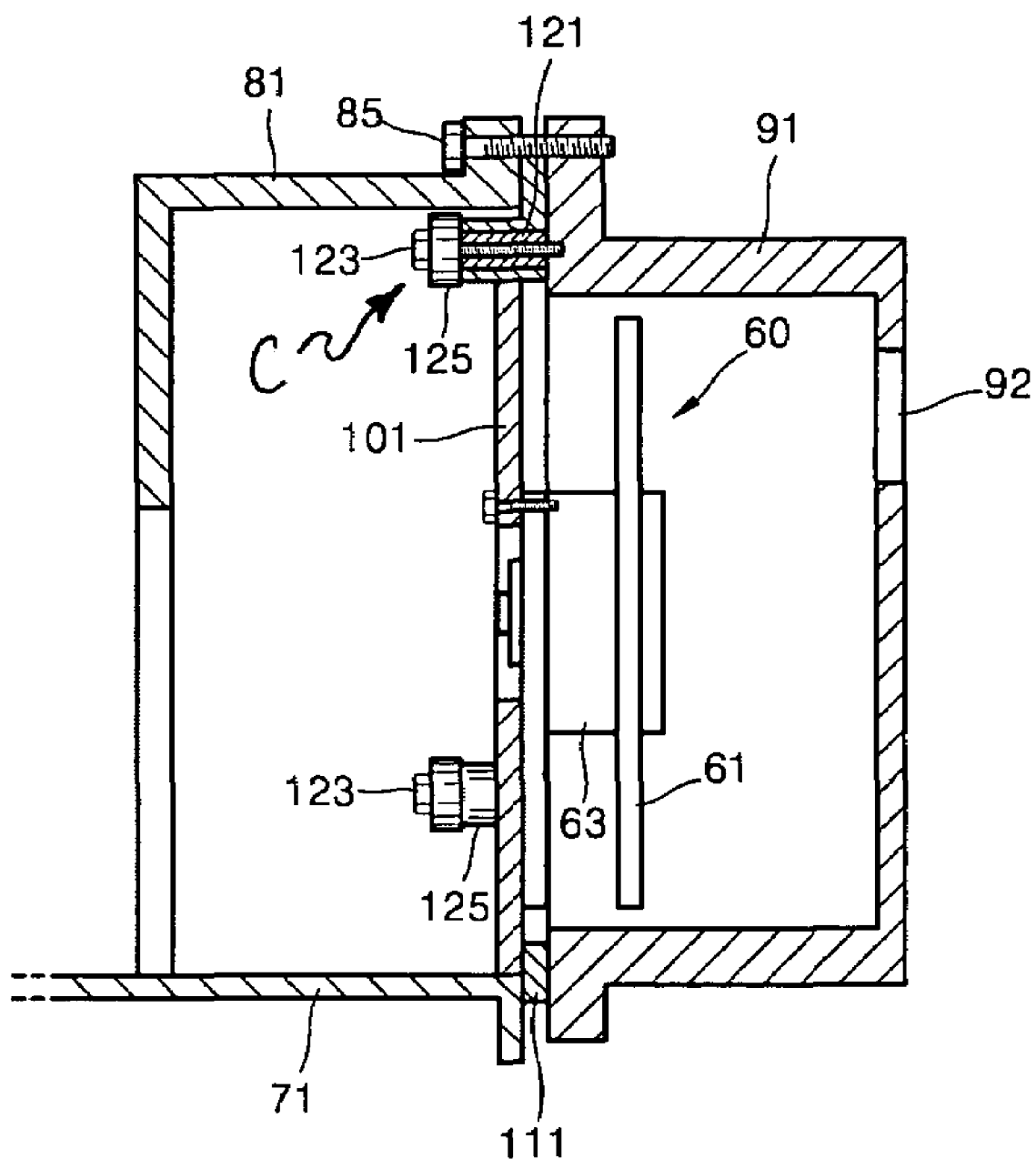
FIG. 4 is a sectional view illustrating the color wheel fixing structure of FIG. 3.

Referring to FIGS. 3 and 4, in a color wheel fixing structure for a projector according to an illustrative, non-limiting embodiment of the present invention, a color wheel 60 is fixed to a base 71 of the projector. The color wheel 60 comprises a color rotating disc 61 which is rotatably installed, and a driving source 63 driving the color rotating disc 61 to rotate. A plurality of color filters 62 selectively transmitting lights having predetermined wavelengths among white light emitted from the lamp 10 of FIG. 1 are provided at the color rotating disc 61.

The color wheel fixing structure according to the present illustrative embodiment comprises a pair of first and second cover members 81 and 91 covering the color wheel 60, a bracket 101 to which the color wheel 60 is coupled, a coupling unit C to couple the bracket 101 to the second cover member 91, and a buffer member 111 which reduces a vibration generated from the color wheel 60 and transferred to the second cover member 91 through the bracket 101 and a vibration transferred from the second cover member 91 to the first cover member 81.

Figure 1:
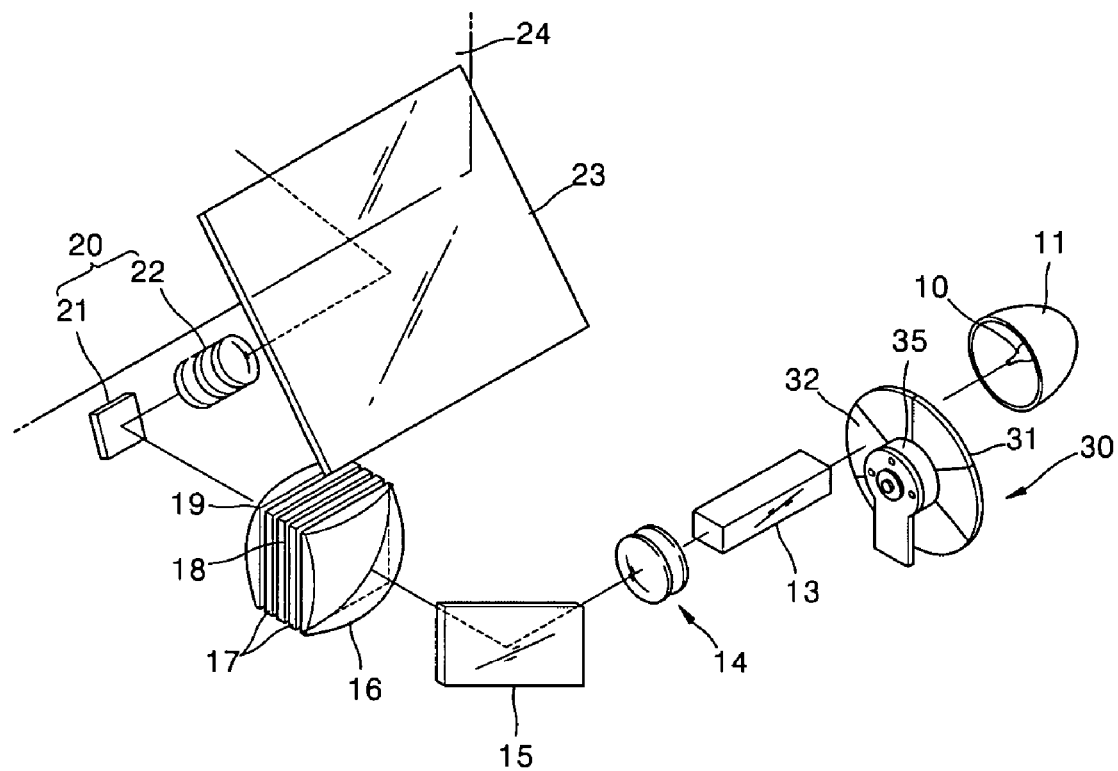
FIG. 1 is a perspective view illustrating the optical structure of a typical color projector to realize a color image using a single LCD panel.
Figure 2:
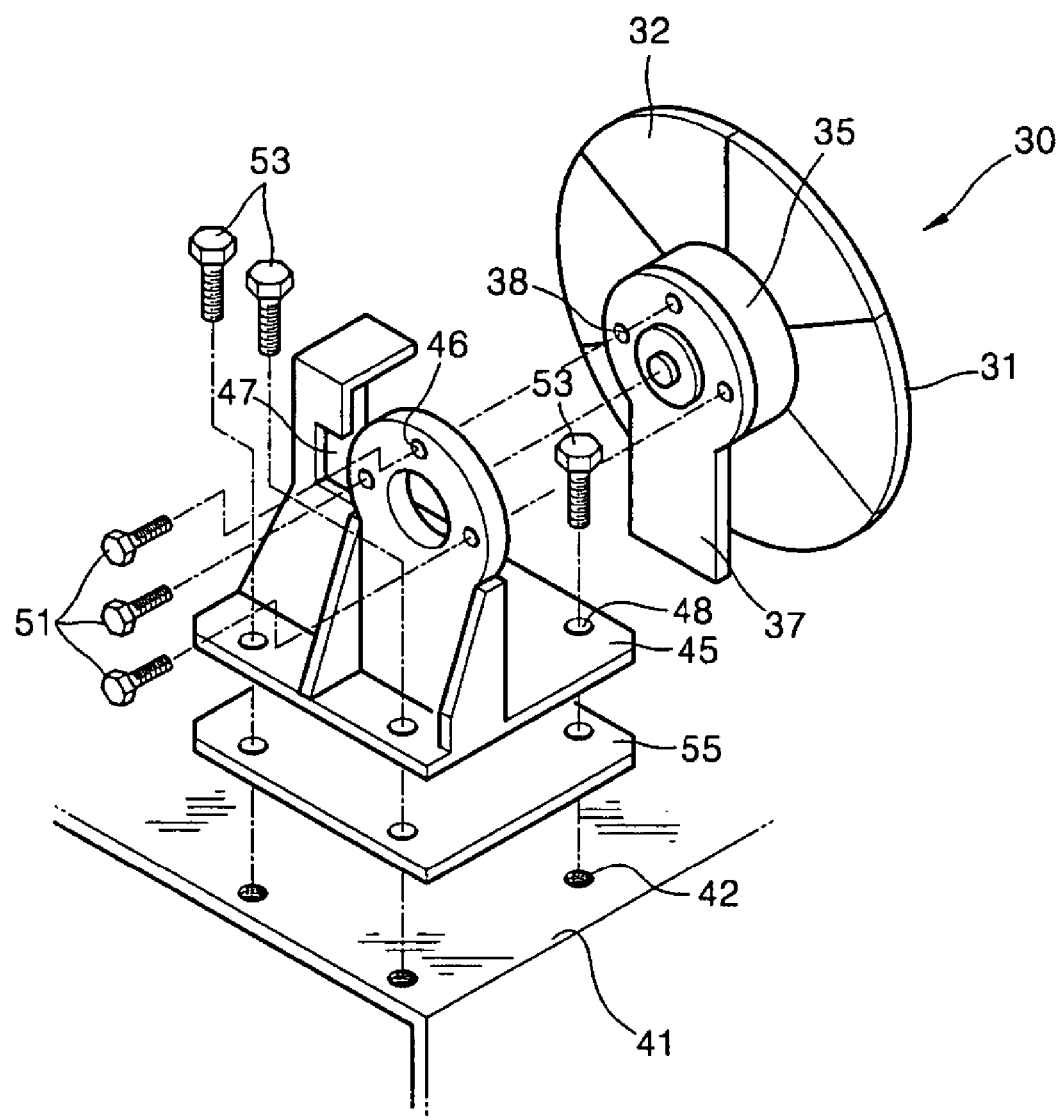
FIG. 2 is an exploded perspective view illustrating a conventional color wheel for a projector and a fixing structure thereof.

The first cover member 81 is directly coupled to a predetermined position of the base 71 or indirectly fixed to the base 71 by being coupled to a housing (not shown) housing the glass rod 13 and the LCD panel 18 of FIG. 1.

The second cover member 91, together with the first cover member 81, encompasses the color wheel 60 and is coupled to the first cover member 81. That is, a plurality of first through-holes 83 and a plurality of first coupling holes 93 are formed in the first cover member 81 and the second cover member 91, respectively. The second cover member 91 is coupled to the first cover member 81 by screwing the first screws 85 into the first coupling holes 93 through the first through-holes 83. The buffer member 111 is disposed between the first and second cover members 81 and 91 to reduce transfer of the vibration of the second cover member 91 toward the first cover member 81. The second cover member 91 has a light passing hole 92 formed therein to secure a path of the light emitted from the lamp 10 of FIG. 1 and proceeding to a predetermined position of the color filters 62. Thus, the vibration and noise generated by the rotation of the color wheel 60 can be reduced by providing the first and second cover members 81 and 91.

The buffer member 111 is provided between the first and second cover members 81 and 91 and simultaneously between the bracket 101 and the second cover member 91. That is, the buffer member 111 may be a ring-shaped rubber pad having a predetermined thickness and the shape and size of the buffer member 111 is formed to correspond to those of the first and second cover members 81 and 91. The bracket 101 is formed less in size than the buffer member 111 to be disposed inside when the second cover member 91 is coupled to the first cover member 81.

The color wheel 60 is directly coupled to the bracket 101. Thus, when vibration is generated in a shaft (not shown) of the color wheel 60, the vibration is directly transferred to the bracket 101. Since the bracket 101 is coupled to the second cover member 91 by the coupling unit C with the buffer member 111 interposed therebetween, the vibration is prevented from being transferred to the second cover member 91.

The coupling unit C comprises a plurality of second coupling holes 95 formed in the second cover member 91, a plurality of second through-holes 113 formed in the buffer member 111 at positions corresponding to the second coupling holes 95, and a plurality of coupling grooves 103 formed in the bracket 101. The coupling unit also includes a plurality of bushings 121, a plurality of second screws 123, and a plurality of buffer washers 125. Each of the bushings 121 is inserted in each of the second through-holes 113 such that part of the outer side of each of the bushings 121 contacts each of the second coupling grooves 103. The second screws 123 are coupled to the through-holes 113 by passing through the bushings 121 and the second through-holes 113 so that the bracket 101 is coupled to the second cover member 91. Each of the buffer washers 125 is inserted around each of the second screws 123 and disposed at the rear of the bracket 103 so that the vibration of the color wheel 60 transferred via the bracket 103 is damped.

Meanwhile, the glass rod 13 of FIG. 1 is arranged such that a light incident surface of the glass rod 13 is close to the color wheel 60 to make the light passing through the color wheel 60 uniform. Thus, considering the feature, the color wheel fixing structure consistent with the present invention further comprises a glass rod holder 105 holding one side of the glass rod 13 across a predetermined position of the bracket 101 and part of the first cover member 81.

As described above, in the color wheel fixing structure consistent with the present invention, when the diameter and the speed of rotation of the color wheel are increased to realize a high quality projector, since the buffer member is provided between the first and second cover members, the transfer of the noise due to the rotation of the color rotating disc of the color wheel and vibration of the shaft of the color wheel can be reduced.

Furthermore, in the above color wheel fixing structure, since a color wheel assembly is completed by coupling the color wheel and the buffer member in the first and second cover members and the color wheel assembly is directly coupled to the base without additional constituent elements, the time to assemble the color wheel assembly to the base can be reduced.

It is contemplated that numerous modifications may be made to the exemplary embodiments of the invention without departing from the spirit and scope of the embodiments of the invention as defined in the following claims.

What is claimed is:

1. A fixing structure for fixing a color wheel to a base of a projector, said color wheel comprising a color rotating disc having a plurality of color filters selectively transmitting light of a predetermined wavelength among white light emitted from a lamp and rotatably installed such that the respective color filters are sequentially arranged on an optical path; and a driving source which drives the color rotating disc to rotate, said fixing structure comprising:
   a first cover member coupled to the base;
   a second cover member coupled to the first cover member and together therewith encompassing the color wheel;
   a bracket to which the color wheel is coupled;
   a coupling unit to couple the bracket to the second cover member; and
   a buffer member provided between the first and second cover members and between the bracket and the second cover member and which reduces vibration generated from the color wheel and transferred to the second cover member via the bracket, and vibration transferred from the second cover member to the first cover member;
   wherein the coupling unit comprises:
      a plurality of coupling holes formed in the second cover member;
      a plurality of through-holes formed in the buffer member at positions corresponding to the coupling holes;
      a plurality of coupling grooves formed in the bracket;
      a plurality of bushings inserted in the through-holes such that part of an outer side of each of the bushings contacts each of the coupling grooves;
      a plurality of screws coupled to the coupling holes by passing through the bushings and the through-holes to couple the bracket to the second cover; and
      a plurality of buffer washers inserted around the screws and arranged at the rear of the bracket to dampen vibration of the color wheel transferred through the bracket.

2. The fixing structure as claimed in claim 1, further comprising a glass rod holder for holding one side of a glass rod which makes light of a predetermined color transmitting the color wheel uniform at a predetermined position of the bracket.

3. A fixing structure for fixing a color wheel to a base of a projector, said color wheel comprising a color rotating disc having a plurality of color filters selectively transmitting light of a predetermined wavelength among white light emitted from a lamp and rotatably installed such that the respective color filters are seQuentially arranged on an optical path; and a driving source which drives the color rotating disc to rotate, said fixing structure comprising:
   a first cover member coupled to the base;
   a second cover member coupled to the first cover member and together therewith encompassing the color wheel;
   a bracket to which the color wheel is coupled;
   a coupling unit to couple the bracket to the second cover member;
   a buffer member provided between the first and second cover members and between the bracket and the second cover member and which reduces vibration aenerated from the color wheel and transferred to the second cover member via the bracket, and vibration transferred from the second cover member to the first cover member; and
   a glass rod holder for holding one side of a glass rod which makes light of a predetermined color transmitting the color wheel uniform at a predetermined position of the bracket.

4. A fixing structure for fixing a color wheel to a base of a projector, said color wheel comprising a color rotating disc having a plurality of color filters selectively transmitting light of a predetermined wavelength among white light emitted from a lamp and rotatably installed such that the respective color filters are sequentially arranged on an optical path; and a driving source which drives the color rotating disc to rotate, said fixing structure comprising:
   a first cover member coupled to the base;
   a second cover member coupled to the first cover member and together therewith encompassing the color wheel;
   a bracket to which the color wheel is coupled;
   a coupling unit to couple the bracket to the second cover member; and
   a buffer member provided between the first and second cover members and between the bracket and the second cover member and which reduces vibration generated from the color wheel and transferred to the second cover member via the bracket, and vibration transferred from the second cover member to the first cover member;
   wherein the coupling unit comprises:
      a plurality of screws coupling together the bracket and the second cover member; and
      a plurality of buffer washers inserted around the plurality of screws to dampen vibration of the color wheel.

* * * * *